(12) United States Patent
Kim et al.

(10) Patent No.: US 9,328,443 B2
(45) Date of Patent: May 3, 2016

(54) OPERATING METHOD OF WASHING MACHINE

(75) Inventors: Pyoung Hwan Kim, Changwon-si (KR); Su Hee Shin, Changwon-si (KR); Seong Hae Jeong, Changwon-si (KR); Young Soo Kim, Changwon-si (KR); Deug Hee Lee, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 1288 days.

(21) Appl. No.: 12/310,775

(22) PCT Filed: Sep. 6, 2007

(86) PCT No.: PCT/KR2007/004312
§ 371 (c)(1),
(2), (4) Date: Mar. 6, 2009

(87) PCT Pub. No.: WO2008/030051
PCT Pub. Date: Mar. 13, 2008

(65) Prior Publication Data
US 2010/0017968 A1    Jan. 28, 2010

(30) Foreign Application Priority Data

Sep. 8, 2006  (KR) .................. 10-2006-0086894

(51) Int. Cl.
*D06F 33/02*  (2006.01)
*D06F 35/00*  (2006.01)
(Continued)

(52) U.S. Cl.
CPC .............. *D06F 33/02* (2013.01); *D06F 35/005* (2013.01); *D06F 35/008* (2013.01); *D06F 39/008* (2013.01); *D06F 39/045* (2013.01); *Y02B 40/56* (2013.01)

(58) Field of Classification Search
CPC ... D06F 35/005; D06F 35/008; D06F 35/006; D06F 33/02; D06F 39/008; Y02B 40/56
USPC .............. 8/149.1–149.3, 158; 68/5 C, 12.08, 68/15–16; 34/443, 467, 474, 475, 60; 223/51; 134/105, 108
See application file for complete search history.

(56) References Cited

U.S. PATENT DOCUMENTS 3,575,193 A * 4/1971 Niewyk et al. ........... 137/119.01
3,650,667 A * 3/1972 Luechauer ........................ 8/111

(Continued)

FOREIGN PATENT DOCUMENTS

CN  1637192  7/2005
DE  3027584 A * 2/1982

(Continued)

OTHER PUBLICATIONS

Machine translation of JP 52058263, dated May 13, 1977.*

*Primary Examiner* — Joseph L Perrin
*Assistant Examiner* — Kevin G Lee
(74) *Attorney, Agent, or Firm* — Dentons US LLP

(57) ABSTRACT

An operating method of a washing machine capable of efficiently washing and sterilizing laundry with a relatively large amount of contaminants is disclosed. The operating method of a washing machine which includes a tub for storing washing water, a drum for accommodating laundry, and a steam generator that is supplied with water for generating steam separately from the washing water to supply steam to the laundry, the operating method including performing a primary rinsing operation for rinsing the laundry to discharge contaminants having a relatively large size to prevent a secondary contamination due to the contaminants having a relatively large size, performing a steam washing operation for supplying steam to steep the contaminants in water and sterilize the laundry while operating the drum, and performing a main washing operation for removing the contaminants and dissolving protein through high-temperature washing water containing a detergent while operating the drum.

17 Claims, 5 Drawing Sheets

(51) Int. Cl.
D06F 39/00 (2006.01)
D06F 39/04 (2006.01)

(56) References Cited

U.S. PATENT DOCUMENTS

| | | | | |
|---|---|---|---|---|
| 3,757,543 | A * | 9/1973 | Braga | 68/17 R |
| 4,084,237 | A * | 4/1978 | Beachem et al. | 700/90 |
| 4,489,574 | A * | 12/1984 | Spendel | 68/16 |
| 4,777,682 | A * | 10/1988 | Dreher et al. | 8/158 |
| 5,191,667 | A * | 3/1993 | Roy et al. | 8/158 |
| 5,758,377 | A * | 6/1998 | Cimetta et al. | 8/158 |
| 5,899,097 | A * | 5/1999 | Adler | 68/18 R |
| 6,125,490 | A * | 10/2000 | Riechman et al. | 8/158 |
| 7,237,293 | B2 * | 7/2007 | Kim | 8/158 |
| 7,941,885 | B2 * | 5/2011 | Wong et al. | 8/158 |
| 8,321,982 | B2 * | 12/2012 | Park et al. | 8/149.3 |
| 2003/0051296 | A1 * | 3/2003 | Broker | D06F 33/02 8/158 |
| 2004/0103069 | A1 * | 5/2004 | Lee | 705/500 |
| 2005/0022317 | A1 * | 2/2005 | Shaffer | 8/159 |
| 2006/0191078 | A1 * | 8/2006 | Kim et al. | 8/159 |

FOREIGN PATENT DOCUMENTS

| | | |
|---|---|---|
| DE | 100 56 889 C1 | 2/2002 |
| DE | 10056889 C1 * | 2/2002 |
| EP | 0 553 803 | 8/1993 |
| EP | 1 505 193 A2 | 2/2005 |
| EP | 1505193 A2 * | 2/2005 |
| JP | 52058263 A * | 5/1977 |
| KR | 10-1999-0034314 | 5/1999 |
| KR | 1019990034314 A * | 5/1999 |
| KR | 10-2005-0000038 | 1/2005 |
| KR | 10-2006-0019982 | 3/2006 |
| KR | 1020060019982 A * | 3/2006 |
| SU | 1481303 | 5/1989 |
| WO | WO 2006/001612 A1 | 1/2006 |
| WO | WO 2006001612 A1 * | 1/2006 |

* cited by examiner

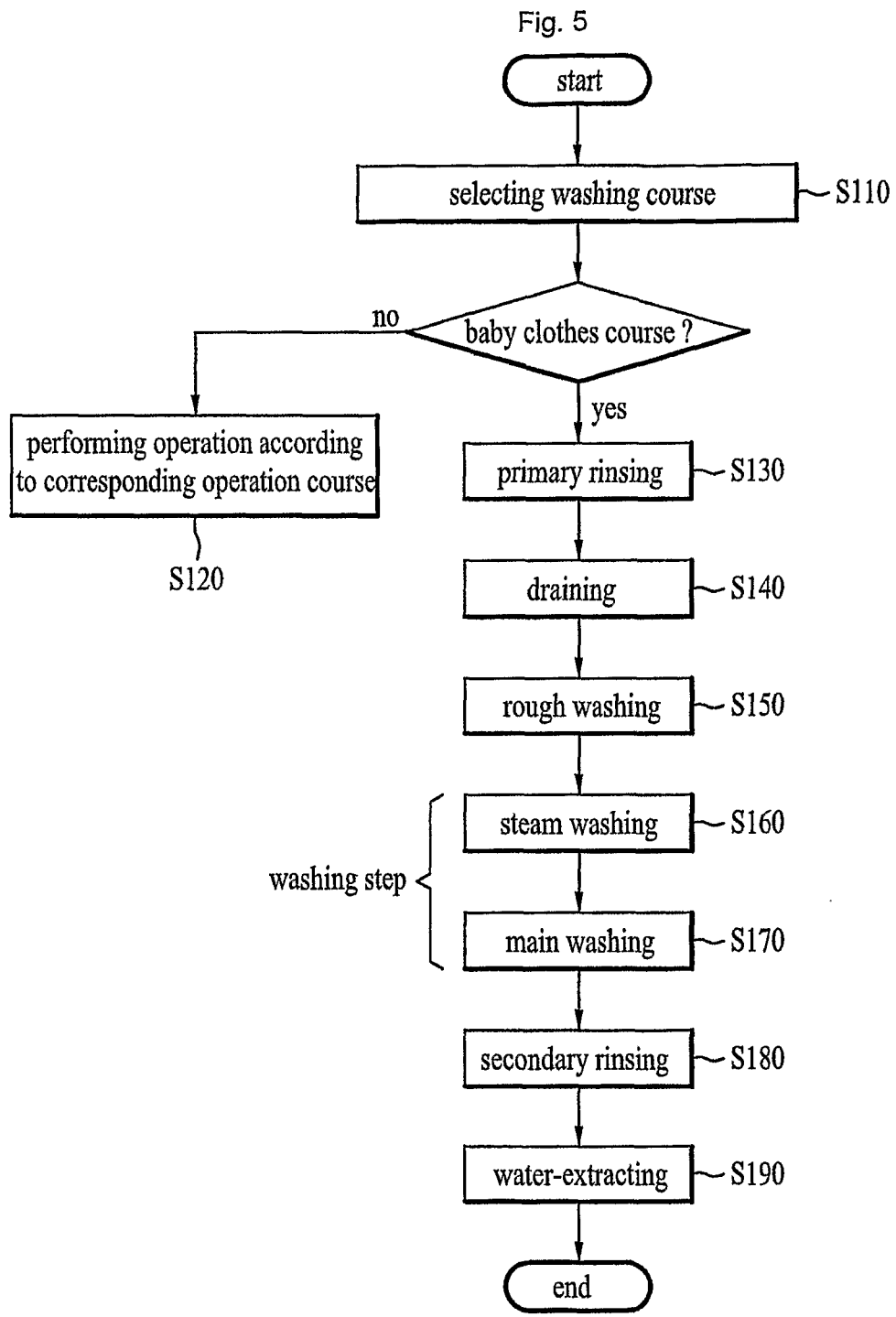

OPERATING METHOD OF WASHING MACHINE

This application is a National Stage Entry of International Application No. PCT/KR2007/004312, filed on Sep. 6, 2007, and claims the benefit of Korean Patent Application No. 10-2006-0086894, filed Sep. 8, 2006, which is hereby incorporated by reference for all purposes as if fully set forth herein in its entirety.

TECHNICAL FIELD

The present invention relates to an operating method of a washing machine, and more particularly to an operating method of a washing machine capable of efficiently washing and sterilizing laundry with a relatively large amount of contaminants.

BACKGROUND ART

Generally, washing machines are classified into a pulsator-type washing machine having a vertically-provided drum and a drum-type washing machine having a horizontally-provided drum.

In the drum-type washing machine, since the drum is disposed in a horizontal direction as described above, a washing operation is performed by dropping laundry loaded in the drum.

FIGS. 1 and 2 schematically show a conventional structure of the above-mentioned drum-type washing machine.

That is, the drum-type washing machine is configured to include a main body 10, a tub 20 mounted in the main body 10, a drum 30 rotatably mounted in the tub 20 and a driving unit for driving the drum 30.

In this case, a loading opening 11 for loading the laundry is disposed on a front surface of the main body 10. A door 40 for opening and closing the loading opening is mounted at a peripheral portion of the loading opening 11.

Further, a gasket 50 for sealing between the door 40 and the loading opening 11 is mounted at an inner periphery of the loading opening 11.

Further, dampers 21 are disposed at opposite sides below an outer surface of the tub 20 such that the tub 20 is supported in the main body 10.

In this case, a heater 60 for washing water which heats the washing water is disposed in a lower space inside the tub 20.

Further, the driving unit is configured to include a driving motor 71 for driving the drum 30 and a belt 72 connected to transfer a driving force of the driving motor 71 to the drum 30. Recently, a direct connection type drum washing machine in which a configuration of the belt 72 is omitted and the driving motor 71 is directly mounted on the tub has been provided.

However, in the above-mentioned conventional washing machine, even when a washing operation for a small amount of laundry or a washing operation for slightly contaminated laundry is performed, a large amount of water is unnecessarily consumed and the washing operation is performed for an approximately same period of time as a general washing process, thereby having a problem such as a unnecessary large consumption of electricity.

Particularly, although it is efficient for a washing performance to perform a steeping process before a washing operation, since a consumption amount of the washing water for the steeping process is considerably large, the steeping process is omitted in a general washing process. Accordingly, the highest washing performance cannot be obtained. Further, a process for sterilizing the laundry is not separately performed in a conventional washing process.

Although not shown in the drawings, recently, there is a structure in which a heater for washing water, which heats washing water, is separately disposed in the washing machine to enable a boiling washing operation. However, since sterilization of the laundry is performed simply by a boiling operation, it is not preferable due to an increase in washing water and power consumption amount required for the boiling operation. Thus, a new operation capable of sterilizing the laundry with a small amount of washing water and low power consumption is required.

Further, the conventional washing machine has a problem of causing a secondary contamination through the washing process since the contaminants are not removed at an initial step in case of baby clothes having a lot of contaminants. For example, the baby clothes are contaminated with contaminants such as milk, mother's milk, spit, vomit, baby food, cake, and feces differently from general laundry. Since a portion of the contaminants has a relatively large size, it is dissolved in the washing process, thereby causing the secondary contamination.

Therefore, a method of efficiently washing laundry having lots of contaminants such as baby clothes has been studied. Further, particularly, the baby clothes may be frequently contaminated with contaminants having protein components. Accordingly, a method of efficiently removing the contaminants having protein components has been studied. In case of baby clothes, necessity for sterilizing the laundry or removing ticks is higher compared to general laundry.

DISCLOSURE OF INVENTION

Technical Problem

An object of the present invention devised to solve the problem lies on an operating method of a washing machine capable of removing contaminants having a relatively large size at an initial step and preventing a secondary contamination due to the contaminants.

Further, another object of the present invention is to provide an operating method of a washing machine capable of efficiently removing contaminants having protein components.

Further, yet another object of the present invention is to provide an operating method of a washing machine capable of sterilizing the laundry and removing ticks, and capable of minimizing consumption of washing water and power to allow an efficient washing operation.

Technical Solution

The objects of the present invention can be achieved by providing an operating method of a washing machine which includes a tub for storing washing water, a drum for accommodating laundry, and a steam generator that is supplied with water for generating steam separately from the washing water to supply steam to the laundry, the operating method comprising: performing a primary rinsing operation for rinsing the laundry to discharge contaminants having a relatively large size to prevent a secondary contamination due to the contaminants having a relatively large size; performing a steam washing operation for supplying steam to steep the contaminants in water and sterilize the laundry while operating the drum; and performing a main washing operation for removing the contaminants and dissolving protein through high-temperature washing water containing a detergent while operating the drum.

Preferably, the water used in rinsing after the primary rinsing operation is drained to discharge relatively large contaminants at an initial step.

The operating method may further include performing a secondary rinsing operation in multiple steps to discharge the contaminants removed from the laundry. The operating method may further include performing a water-extracting operation for discharging water and contaminants remaining in the laundry out of the tub.

In the secondary rinsing operation performed in multiple steps, water supply and rinsing operations are repeated many times, preferably, four times.

Preferably, at the main washing operation, the temperature of the washing water is in a temperature range for optimal activation of a protein-dissolving enzyme contained in the detergent. That is, the washing water is not general cold water but heated washing water, preferably, washing water heated using the steam.

The washing water may be circulated and sprayed to be resupplied into the drum at the main washing operation. The steam may be sprayed to be supplied into the drum at the steam washing operation. Accordingly, it is possible to efficiently supply washing water and steam uniformly to the laundry inside the drum only with a small amount of washing water and steam.

Preferably, the washing water and the steam are sprayed sequentially or at the same time for at least a specified period of time. Accordingly, the temperature of the washing water can be increased to a desired temperature in a short period of time.

Meanwhile, the steam washing operation is performed at the same time with the main washing operation or is performed at an initial step of the main washing operation.

The objects of the present invention can be achieved by providing an operating method of a washing machine which includes a tub for storing washing water and a drum for accommodating laundry, the operating method comprising: performing a primary rinsing operation for rinsing the laundry before washing the laundry; performing a draining operation for draining the washing water used in the primary rinsing operation; performing a washing operation for supplying a detergent and washing water to wash the laundry; and performing a secondary rinsing operation for rinsing the washed laundry.

The operating method may further include performing a water-extracting operation for discharging the washing water used in rinsing.

The operating method may further include receiving selection of the operation courses from a user before the primary rinsing operation before the primary rinsing operation, that is, before the operation of the washing machine is started.

The operating method may further include performing a rough washing operation for prewashing the laundry between the primary rinsing operation and the steam washing operation.

The washing machine may further include a steam generator for supplying steam to the laundry. Accordingly, the operating method of the washing machine according to the present invention may include steps related to the steam. Preferably, the steam generator is supplied with water for generating steam separately from the washing water stored in the tub.

Meanwhile, the washing operation may include performing a steam washing operation for supplying steam to steep the contaminants in water and sterilize the laundry while operating the drum; and performing a main washing operation for removing the contaminants and dissolving protein through high-temperature washing water containing a detergent while operating the drum.

The operating method of the washing machine may be performed by one operation course. If any one of a number of operation courses is selected, the washing machine may be operated according to the operating method. For example, if a baby clothes washing course is selected from a number of operation courses and the operation of the washing machine is started, the washing machine may be operated according to the above-described operating method without an additional user's selection.

Further, the washing operation may include supplying washing water containing a detergent to a preset water level; performing a steam washing operation for supplying steam to increase a temperature of the washing water and an atmosphere temperature inside the drum; and performing a main washing operation for removing contaminants while operating the drum.

The steam may be supplied until the washing water reaches a preset temperature at the steam washing operation. Further, the preset temperature may be in a temperature range for optimal activation of a protein-dissolving enzyme contained in the detergent.

Advantageous Effects

As described above, according to the present invention, there is provided an operating method of a washing machine capable of removing contaminants having a relatively large size at an initial step and preventing a secondary contamination due to the contaminants.

Further, according to the present invention, there is provided an operating method of a washing machine capable of efficiently removing contaminants having protein components.

Further, according to the present invention, there is provided an operating method of a washing machine capable of sterilizing the laundry and removing ticks, and capable of minimizing consumption of washing water and power to allow an efficient washing operation since the washing water is heated using the steam and it is not necessary to steep the laundry in water.

Further, according to the present invention, there is provided an operating method of a washing machine with convenient use by performing a series of steps and completing the steps as the user selects one course without separate operation of an option button or the like.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 5 illustrates a flowchart for explaining an operating method of the washing machine according to the present invention.

BEST MODE FOR CARRYING OUT THE INVENTION

Reference will now be made in detail to the preferred embodiments of the present invention, examples of which are illustrated in the accompanying drawings.

Hereinafter, a washing machine and an operating method of the washing machine according to the present invention will be described in detail with reference to FIGS. 3 to 5.

Figure 1:
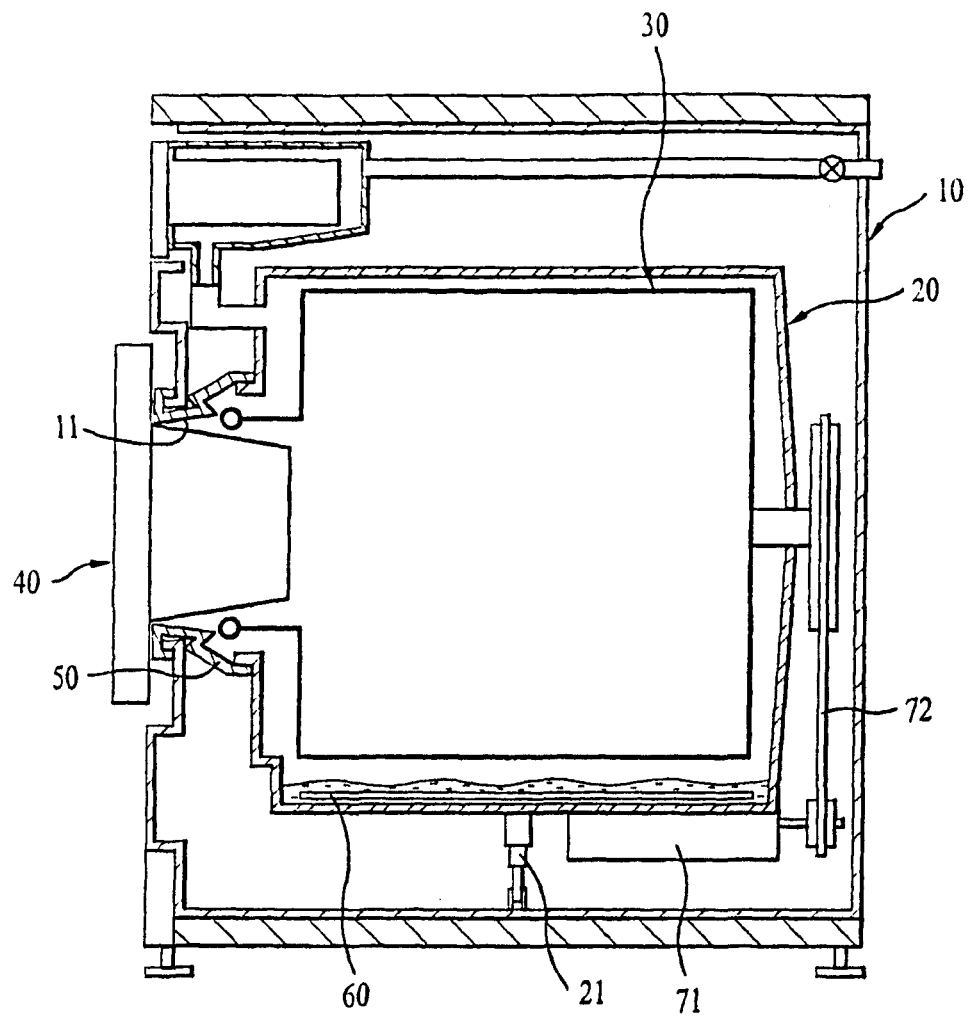
FIG. 1 illustrates a side cross-sectional view for explaining an inner structure of a conventional general drum-type washing machine.
Figure 2:
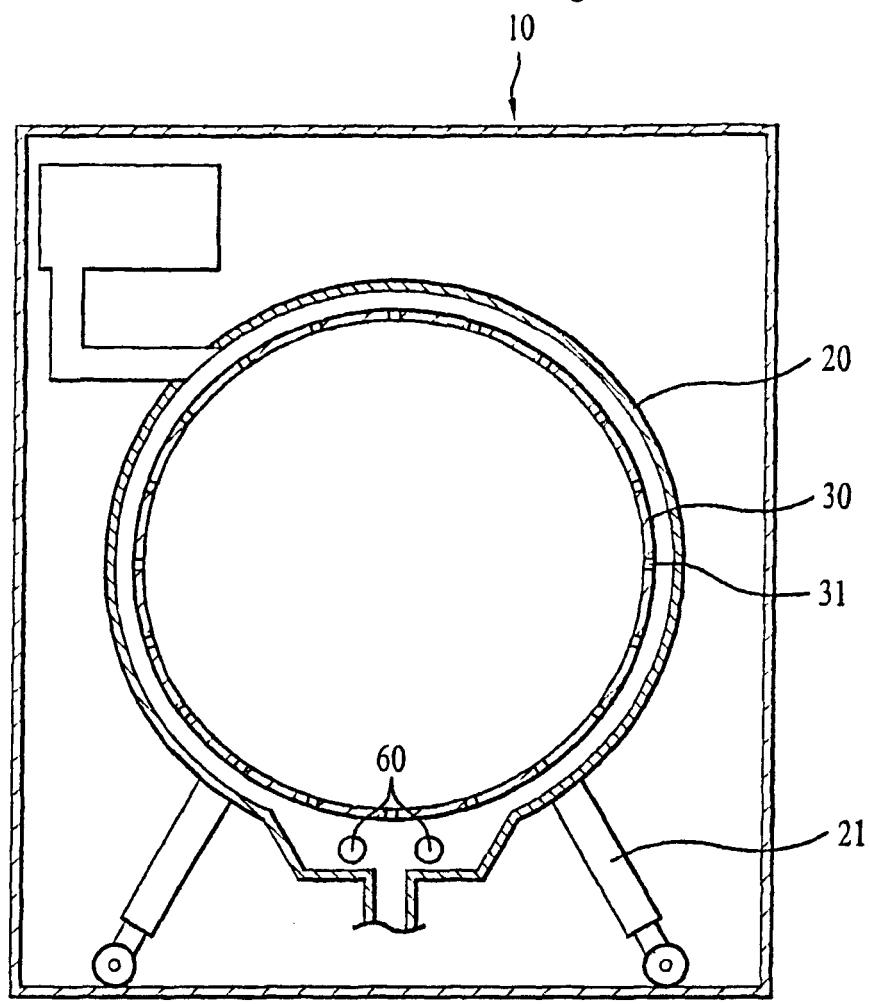
FIG. 2 illustrates a front cross-sectional view for explaining an inner structure of the conventional general drum-type washing machine.
Figure 3:
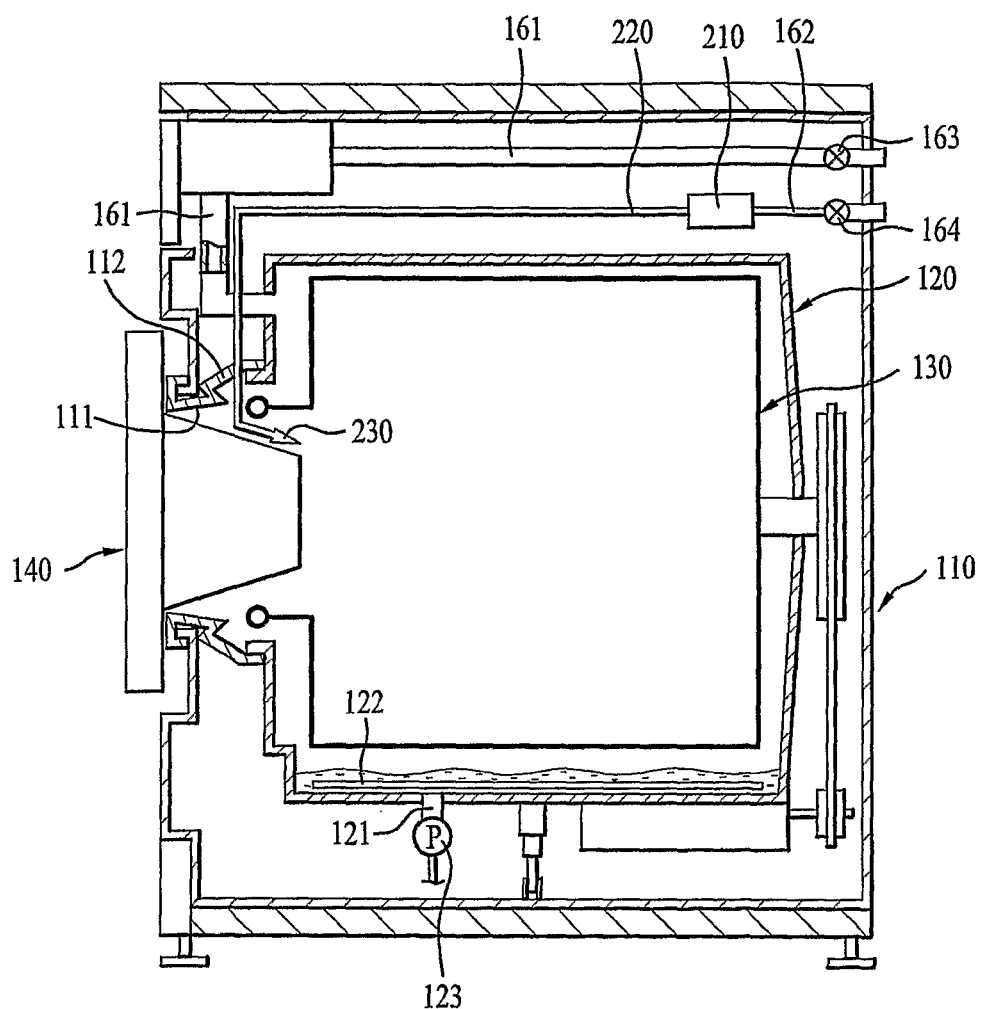
FIG. 3 illustrates a side cross-sectional view for explaining an inner structure of a washing machine according to the present invention.
Figure 4:
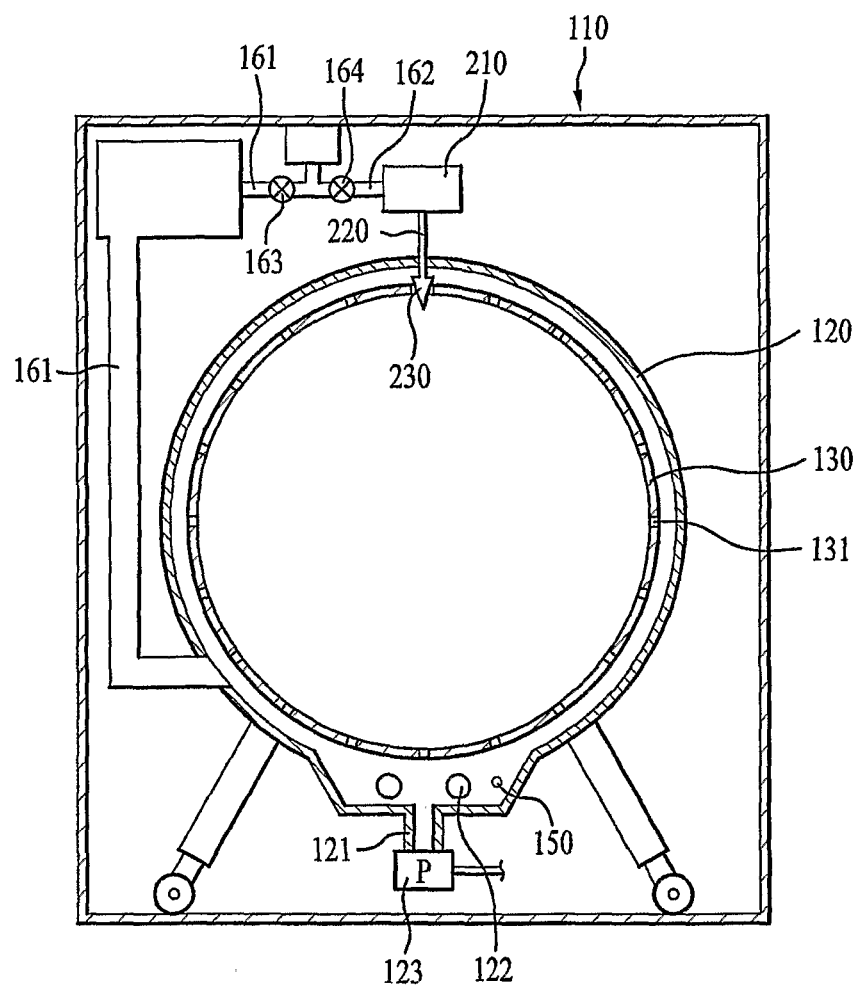
FIG. 4 illustrates a front cross-sectional view for explaining an inner structure of the washing machine according to the present invention.

First, as shown in FIGS. 3 and 4, the washing machine according to one embodiment of the present invention is a drum type washing machine configured to include a main body 110, a tub 120 and a drum 130. A steam generator may be separately provided to use the steam and a temperature sensor 150 may be also provided.

The main body 110 forms an external appearance of the drum type washing machine and a loading opening 111 is disposed on a front surface of the main body 110.

In this case, a door 140 for opening and closing the loading opening 111 is mounted on the loading opening 111 of the main body 110. A gasket 112 for sealing between the door 140 and the loading opening 111 is mounted on an inner peripheral surface of the loading opening 111.

Further, a washing water supply line 113 is provided in the main body 110 to supply washing water into the tub 120.

Further, the tub 120 is provided to be supported in the main body 110.

A heater 122 for washing water, which heats the washing water supplied into the tub 120, is further disposed at a lower end portion of the tub 120. However, the heater 122 for washing water is not necessarily required to perform the operating method of the washing machine according to the present invention.

Further, a drain channel 121 for draining the washing water is connected to the lower end of the tub 120.

A drain pump 123 which is driven to compulsorily drain the washing water is disposed on the drain channel 121.

Further, the drum 130 is rotatably installed in the tub 120. The drum 130 is mounted such that an opening of the drum 130 is positioned toward the loading opening 111 of the main body 110.

In this case, a number of through holes 131 are formed on a circumferential surface of the drum 130 such that the washing water supplied into the tub 120 is introduced into the drum 130.

Further, the steam generator is configured to provide a specified amount of steam into the tub 120 and/or the drum 130 and at least one steam generator is disposed.

The steam generator is installed to convert water into steam using high-temperature hot air and supply the steam into the tub 120 and/or the drum 130. The steam generator is configured to include a heating unit 210 which converts water into steam using high-temperature hot air and a steam supply line 220 which allows the flow of the steam evaporated by the heating unit 210.

Further, the steam generator is configured to further include an injection nozzle 230 which sprays the steam flowing through the steam supply line 220 into the tub 120 and/or the drum 130.

In this case, the injection nozzle 230 is configured in a nozzle shape to smoothly spray the steam. Preferably, an end portion of the injection nozzle 230 for discharging the steam is installed to pass through the gasket 112 toward the inside of the drum 130. The steam is supplied to the laundry inside the drum through the injection nozzle.

Further, the temperature sensor 150 is disposed in a space including the heater 122 at the lower side of the tub 120 and serves to sense an inner temperature of the tub 120.

In this case, the temperature sensed by the temperature sensor 150 may be used to control the operation of the steam generator and control the temperature of the washing water in the tub.

Meanwhile, a reference numeral 161 is a washing water supply line which supplies washing water into the tub 120, and a reference numeral 162 is a water supply line which supplies water for generating steam into the steam generator. Further, the steam generator is disposed separately from the tub. Accordingly, the water supplied into the steam generator is distinguished from the washing water in the tub. Thus, the washing water including a detergent and the like is not supplied into the steam generator.

Further, reference numerals 163 and 164 are opening/closing valves which open and close paths of the washing water supply line 161 and the water supply line 162, respectively.

Hereinafter, the operating method of a washing machine according to the embodiment of the present invention will be described in detail using the structure of the above-described drum-type washing machine with reference to FIG. 5.

First, a controller (not shown) of the washing machine receives an operation course which is selected by a user (S110).

In this case, the operation course may include a course for at least one of operations such as standard washing cloth-based washing tub sterilization, boiling washing and baby clothes washing. In this case, a baby clothes washing course is not necessarily a course for washing baby clothes. An operation course for performing a washing operation according to the operation method of the present invention is referred to as a "baby clothes washing course" for convenience of explanation.

When a washing course is selected by the user, the controller checks whether the selected washing course is the baby clothes washing course.

If the selected washing course is not the baby clothes washing course, the operation thereof is performed by a preset algorithm corresponding to the operation course (S120).

On the other hand, if the selected washing course is the baby clothes washing course, the controller performs a primary rinsing operation by controlling a water supply valve 163 to supply the washing water into the tub 120 (S130). In this case, the level of the washing water may be set to sufficiently rinse relatively large contaminants and the drum is operated to improve rinsing performance.

Meanwhile, preferably, the washing water is cold water at the primary rinsing step for separating relatively large contaminants from the laundry and discharging them. If the washing water has a high temperature, the contaminants may be dissolved physically and chemically to cause a secondary contamination.

Accordingly, at the primary rinsing step, the contaminants are strongly separated from the laundry using cold water. Further, since the contaminants adhered to the laundry are steeped in water through the rinsing step, the contaminants can be easily removed through the following washing step.

Further, if the primary rinsing operation is finished, the washing water used in rinsing is drained (S140). Then, a rough washing operation may be performed for a primary washing operation using a detergent and washing water as occasion demands (S150). The rough washing operation may be performed only when the user additionally selects the rough washing operation. Further, it is possible to automatically perform the rough washing operation by selecting the above-described baby clothes washing course. After the rough washing operation is completed, it is preferable to drain the washing water.

Then, if the draining operation is totally completed, a washing step for washing the laundry using a detergent and washing water is performed.

In this case, the washing step may be performed in the same manner as a general conventional washing step. That is, a detergent and washing water are supplied into the drum and the drum is operated to perform a washing operation.

Meanwhile, the washing step may be a washing step using steam. In this case, the washing step includes a steam washing operation for supplying steam to the laundry inside the drum (S160). Preferably, the steam supply is performed by spraying the steam to increase an effect of the steam supply. The steam supply may be performed for a specified period of time or until the temperature of the drum or the tub reaches a specified temperature. The steam supply may be repeatedly performed in a specified cycle. Further, the steam may be supplied uniformly to the laundry by repeatedly lifting and dropping the laundry due to the operation of the drum in order to increase an effect of the steam supply.

The contaminants adhered to the laundry can be sufficiently steeped in water in a short period of time by the steam washing operation. Further, it is possible to efficiently sterilize ticks and the like through the steam. Since the steam has very fine particles, the steam can be supplied to the laundry with a large surface area and the steam can be supplied to all over the laundry, not a specified portion of the laundry.

Meanwhile, the effect of the steam washing operation improves a washing force in the following washing step. Further, since the inner temperature of the drum and the tub increases through the steam washing operation, it is possible to prevent consumption of excessive power for increasing the temperature of the washing water in the washing step.

The steam washing operation may be performed at the same time with the following main washing operation. Also, the steam washing operation may be performed at an initial step of the main washing operation. The washing step may include the steam washing operation and the following main washing operation. That is, the steam washing operation and the main washing operation are not completely separated from each other and may be performed at the same time for at least a specified period of time. Further, washing water and a detergent can be supplied into the tub in advance before the steam washing operation. Accordingly, the washing operation may be performed through a detergent and washing water even at the steam washing operation.

After the steam washing operation S160 is completed, the main washing operation S170 is performed with the steam washing operation. The main washing operation is performed through washing water containing a detergent. The drum is also operated to increase the washing effect. Although not shown in the drawings, it is preferable to spray washing water circulating by a washing water circulating pump to the laundry inside the drum. Accordingly, the washing water containing a detergent is circulated and sprayed in the same manner as the above-mentioned steam spray, thereby uniformly supplying the washing water containing a detergent uniformly to the laundry.

It is preferable to perform a washing operation through high-temperature washing water at the main washing operation. Accordingly, it is possible to efficiently remove contaminants having a lot of protein components as described above. Generally, the detergent contains a protein-dissolving enzyme. The optimal activation temperature of the protein-dissolving enzyme is in a temperature range of about 50 to 60° C. Thus, it is preferable to control the temperature of the laundry as well as the inner temperature of the tub and drum within the temperature range. For this, it is possible to control the temperature of the washing water at about 70° C. since the temperature may be reduced due to circulation of the washing water or the laundry. However, as described above, if the temperature of the drum, tub and laundry increases due to the steam washing operation, although the temperature of the washing water is controlled to be lower than 70° C., it is possible to maintain the temperature in a range of about 50 to 60° C. when the washing water containing a detergent is supplied to the laundry.

Further, it is possible to efficiently remove general contaminants as well as contaminants having protein components through the main washing operation since the contaminants are sufficiently steeped in water through the steam washing operation.

Meanwhile, the washing water may be heated by the heater for washing water and the steam supplied into the drum. Also, the washing water may be heated only by the steam.

In this case, it is very advantageous in the energy-saving aspect to heat the washing water to have a high temperature using the steam. For example, the steam is very advantageous when considering energy required for increasing the temperature of the laundry or an atmosphere temperature inside the drum up to 60° C. That is, when a small amount of water is heated to generate steam and spray the steam into the drum, it is possible to easily increase the atmosphere temperature inside the drum or the temperature of the laundry. On the other hand, since a large amount of washing water should be heated to increase the atmosphere temperature inside the drum using the heater for washing water, energy consumption becomes large.

When the washing water is heated only for the steam, it is preferable to supply a detergent and washing water into the tub to a preset water level. In this case, although the amount of washing water may be determined according to the laundry amount, it is preferable that the amount of washing water is small compared to a general washing case. When the steam is supplied to increase the temperature of the washing water as well as the atmosphere temperature inside the drum, if the amount of the washing water is large, the amount of the steam should be also large. Further, a detergent can be activated at an optimal level in even a small amount of washing water through the steam, thereby expecting a boiling washing effect. That is, although a small amount of washing water is used, since the steam and high-temperature washing water are used, the detergent is sufficiently activated. Accordingly, detergent remnants generated due to insufficient dissolution of the detergent can be minimized. Further, in this case, since a multi-step secondary rinsing operation can be performed, contaminants, detergent remnants and the like can be efficiently discharged as will be described below.

Meanwhile, it is preferable to circulate and spray the washing water into the drum at the steam washing operation S160 to efficiently increase the temperature of the washing water.

Then, if the washing step including the steam washing operation S160 and the main washing operation S170 is completed, the washing water used in the washing step is drained and a secondary rinsing operation S180 for rinsing the washed laundry is performed. The washing step is performed in the same manner even at a general washing step.

The secondary rinsing operation is performed to discharge contaminants separated from the laundry at the previous operations. Preferably, the secondary rinsing operation is performed in multiple steps to completely discharge contaminants separated from the laundry. Although the rinsing effect increases as the number of repeated water supply and rinsing operations increases, according to the experiment results obtained by inventors of the present invention, when the rinsing operation is performed in four steps by strongly operating the drum, it is possible to obtain a sufficient rinsing effect.

If the secondary rinsing operation is completed, a water-extracting operation S190 is performed to surely discharge water and the contaminants remaining in the laundry.

The washing course is performed through the above-described sequential operations and completed. Further, as described above, in the operating method of the washing machine according to the present invention, it is controlled such that all steps are automatically performed when the user selects one washing course. Thus, although the user selects one operation course, the above-described operation of the washing machine is performed with convenient use and control.

INDUSTRIAL APPLICABILITY

Included in the detailed description of the invention.

The invention claimed is:

1. An operating method of a washing machine which includes a tub for storing washing water, a drum rotatably installed in the tub for accommodating laundry, and a steam generator disposed separately from the tub and supplied with water through a supply line separate from a supply line for the washing water, wherein the water is used for generating steam to be supplied to the laundry, the operating method comprising:
performing a primary rinsing operation with cold water for rinsing first contaminants from the laundry while operating the drum;
draining the washing water after the primary rinsing operation and supplying washing water containing a detergent to a preset water level;
performing a steam washing operation for supplying steam to steep second contaminants adhered to the laundry in water and to sterilize the laundry while operating the drum,
wherein the steam washing operation is performed for a specified period of time or until a specified temperature is reached in the drum;
performing a main washing operation for removing remaining general contaminants, from the laundry, through high-temperature washing water containing a detergent while operating the drum,
wherein the high-temperature washing water is sprayed and circulated to the laundry through the operation of the drum,
wherein the temperature of the laundry and the inner atmosphere temperature of the drum are maintained at an optimum temperature for detergent activation by accounting for any temperature change achieved in the steam washing operation, and
wherein the high-temperature washing water is heated by a heater and by steam from a concurrent steam washing operation;
performing a secondary rinsing operation in multiple steps including multiple water supply and rinse steps to discharge remaining contaminants separated from the laundry from previous operations,
wherein the drum is strongly operated during the secondary rinsing operation; and
performing a water-extracting operation for discharging water and contaminants further remaining in the laundry out of the tub after the secondary rinsing operation,
wherein when any one of a number of operation courses is selected by a course selector without a selection of options by an option selector which is separately provided from the course selector before an operation of the washing machine is started, the operating method of the washing machine is automatically and sequentially performed, and
wherein the high-temperature washing water is heated to about 70° C. to maintain the optimum temperature at a range of 50° C. to 60° C.

2. The operating method according to claim 1, further comprising:
performing a rough washing operation for prewashing the laundry between the primary rinsing operation and the steam washing operation.

3. The operating method according to claim 1, wherein the steam is sprayed to be supplied into the drum at the steam washing operation.

4. The operating method according to claim 1, wherein the steam washing operation is performed at the same time with the main washing operation or is performed at an initial step of the main washing operation.

5. The operating method according to claim 1, wherein the high-temperature washing water is generated by heating the washing water using the steam.

6. The operating method of claim 1, wherein the remaining general contaminants include contaminants having protein components.

7. The operating method of claim 1, wherein the multiple steps comprise four rinsing steps.

8. An operating method of a washing machine which includes a tub for storing washing water, a drum rotatably installed in the tub for accommodating laundry, and a steam generator disposed separately from the tub that is supplied with water through a supply line separate from a supply line for the washing water, wherein the water is used for generating steam to be supplied to the laundry, the operating method comprising:
receiving selection of operation courses from a user;
performing a primary rinsing operation with cold water for rinsing first contaminants from the laundry while operating the drum;
performing a draining operation for draining the washing water used in the primary rinsing operation;
performing a washing operation for supplying a detergent and washing water to wash the laundry, the washing operation including:
performing a steam washing operation for supplying steam to steep second contaminants adhered to the laundry in water and to sterilize the laundry while operating the drum,
wherein the steam washing operation is performed for a specified period of time or until a specified temperature is reached in the drum or the tub; and
performing a main washing operation for removing the remaining general contaminants from the laundry through high-temperature washing water containing a detergent while operating the drum, wherein the high-temperature washing water is sprayed and circulated to the laundry through the operation of the drum, wherein the temperature of the laundry and the inner atmosphere temperature of the tub and drum are maintained at an optimum temperature for detergent activation accounting for any temperature changed achieved in the steam washing operation, and wherein the washing water is heated by a heater and by steam from a concurrent steam washing operation;

performing a secondary rinsing operation including multiple water supply and rinse steps for discharging remaining contaminants separated from the laundry from previous operations, wherein the drum is strongly operated during the secondary rinsing operation, and wherein when any one of a number of operation courses is selected before the primary rinsing operation, the operating method of the washing machine is automatically and sequentially performed; and performing a final water-extracting operation, wherein the high-temperature washing water is heated to about 70° C. to maintain the optimum temperature at a range of 50° C. to 60° C.

9. The operating method according to claim 8, further comprising:

performing a rough washing operation for prewashing the laundry between the draining operation and the washing operation.

10. The operating method according to claim 8, wherein the high-temperature washing water is generated by heating the washing water using the steam.

11. The operating method according to claim 8, wherein the steam washing operation is performed at the same time with the main washing operation or is performed at an initial step of the main washing operation.

12. The operating method according to claim 8, wherein the secondary rinsing operation is performed in multiple steps.

13. The operating method according to claim 12, wherein water supply and rinsing operations are repeated four times at the secondary rinsing operation.

14. An operating method of a washing machine which includes a tub for storing washing water, a drum rotatably installed in the tub for accommodating laundry and a steam generator disposed separately from the tub and supplied with water through a supply line separate from a supply line for the washing water, wherein the water is used for generating steam to be supplied to the laundry, the operating method comprising:

performing a primary rinsing operation with cold water for rinsing first contaminants from the laundry while operating the drum;

performing a draining operation for draining the washing water used in the primary rinsing operation;

performing a washing operation for supplying a detergent and washing water to wash the laundry;

performing a secondary rinsing operation including multiple water supply and rinse steps for discharging remaining contaminants separated from the laundry from previous operations; and performing a water-extracting operation, wherein when any one of a number of operation courses is selected before the primary rinsing operation by a course selector without a selection of options by an option selector which is separately provided from the course selector, the operating method of the washing machine is automatically and sequentially performed, and wherein the washing operation includes:

supplying washing water containing a detergent to a preset water level;

performing a steam washing operation for supplying steam to steep second contaminants adhered to the laundry in water, to sterilize the laundry while operating the drum, and to increase a temperature of the washing water and an atmosphere inside the drum; and performing a main washing operation for removing remaining general contaminants from the laundry through high-temperature washing water containing a detergent while operating the drum, while operating the drum, wherein the high-temperature washing water is sprayed and circulated to the laundry through the operation of the drum, wherein the temperature of the laundry and the atmosphere of the inside of the drum are maintained at an optimum temperature for detergent activation by accounting for the increased temperature reached from the steam washing operation, and wherein the high-temperature washing water is heated by a heater and by steam from a concurrent steam washing operation, and wherein the high-temperature washing water is heated to about 70° C. to maintain the optimum temperature at a range of 50° C. to 60° C.

15. The operating method according to claim 14, wherein the steam is supplied until the washing water reaches a preset temperature at the steam washing operation.

16. The operating method according to claim 15, wherein the preset temperature is in a temperature range for optimal activation of a protein-dissolving enzyme contained in the detergent.

17. The operating method according to claim 14, wherein the steam washing operation is performed at the same time with the main washing operation or is performed at an initial step of the main washing operation.

* * * * *